(12) United States Patent
Gardner

(10) Patent No.: US 9,132,416 B1
(45) Date of Patent: Sep. 15, 2015

(54) NANO-STRUCTURED NOBLE METAL CATALYSTS BASED ON HEXAMETALLATE ARCHITECTURE FOR THE REFORMING OF HYDROCARBON FUELS

(75) Inventor: Todd H. Gardner, Morgantown, WV (US)

(73) Assignee: U.S. Department of Energy, Washington, DC (US)

( * ) Notice: Subject to any disclaimer, the term of this patent is extended or adjusted under 35 U.S.C. 154(b) by 2371 days.

(21) Appl. No.: 11/947,125

(22) Filed: Nov. 29, 2007

(51) Int. Cl.
*B01J 23/63* (2006.01)
*B01J 23/58* (2006.01)
*B01J 23/78* (2006.01)
*B01J 23/22* (2006.01)
*B01J 23/26* (2006.01)
*B01J 21/04* (2006.01)
*B01J 23/40* (2006.01)
*B01J 23/02* (2006.01)

(52) U.S. Cl.
CPC . *B01J 23/63* (2013.01); *B01J 21/04* (2013.01); *B01J 23/02* (2013.01); *B01J 23/22* (2013.01); *B01J 23/26* (2013.01); *B01J 23/40* (2013.01); *B01J 23/58* (2013.01); *B01J 23/78* (2013.01)

(58) Field of Classification Search
USPC ............... 423/592.1, 651, 652, 654; 502/325, 502/327, 328, 330, 332, 340, 344, 319, 341, 502/355, 353
See application file for complete search history.

(56) References Cited

U.S. PATENT DOCUMENTS

| | | | |
|---|---|---|---|
| 5,788,882 A * | 8/1998 | Kitai et al. | 252/301.4 R |
| 6,171,992 B1 | 1/2001 | Autenrieth et al. | |
| 6,193,908 B1 * | 2/2001 | Hampden-Smith et al. | 252/301.4 R |
| 6,291,381 B1 | 9/2001 | Lin et al. | |
| 6,294,492 B1 | 9/2001 | Lin | |
| 6,808,652 B2 | 10/2004 | Park et al. | |
| 6,884,340 B1 | 4/2005 | Bogdan | |
| 6,905,998 B2 | 6/2005 | Naka et al. | |
| 6,958,310 B2 | 10/2005 | Wang et al. | |
| 7,067,453 B1 | 6/2006 | Ming et al. | |
| 7,150,866 B2 | 12/2006 | Wieland et al. | |
| 7,166,268 B2 | 1/2007 | Fukunaga | |
| 2004/0167366 A1 * | 8/2004 | Rao et al. | 570/177 |
| 2005/0265920 A1 * | 12/2005 | Ercan et al. | 423/651 |

OTHER PUBLICATIONS

U.S. Appl. No. 11/390,216, Gardner, et al.

* cited by examiner

*Primary Examiner* — Kaj K Olsen
*Assistant Examiner* — Pritesh Darji
(74) *Attorney, Agent, or Firm* — Jacob A. Heafner; Brian J. Lally; John T. Lucas

(57) ABSTRACT

Nano-structured noble metal catalysts based on hexametallate lattices, of a spinel block type, and which are resistant to carbon deposition and metal sulfide formation are provided. The catalysts are designed for the reforming of hydrocarbon fuels to synthesis gas. The hexametallate lattices are doped with noble metals (Au, Pt, Rh, Ru) which are atomically dispersed as isolated sites throughout the lattice and take the place of hexametallate metal ions such as Cr, Ga, In, and/or Nb. Mirror cations in the crystal lattice are selected from alkali metals, alkaline earth metals, and the lanthanide metals, so as to reduce the acidity of the catalyst crystal lattice and enhance the desorption of carbon deposit forming moieties such as aromatics. The catalysts can be used at temperatures as high as 1000° C. and pressures up to 30 atmospheres. A method for producing these catalysts and applications of their use also is provided.

10 Claims, 7 Drawing Sheets

Structure of ideal magnetoplumbite and β-alumina

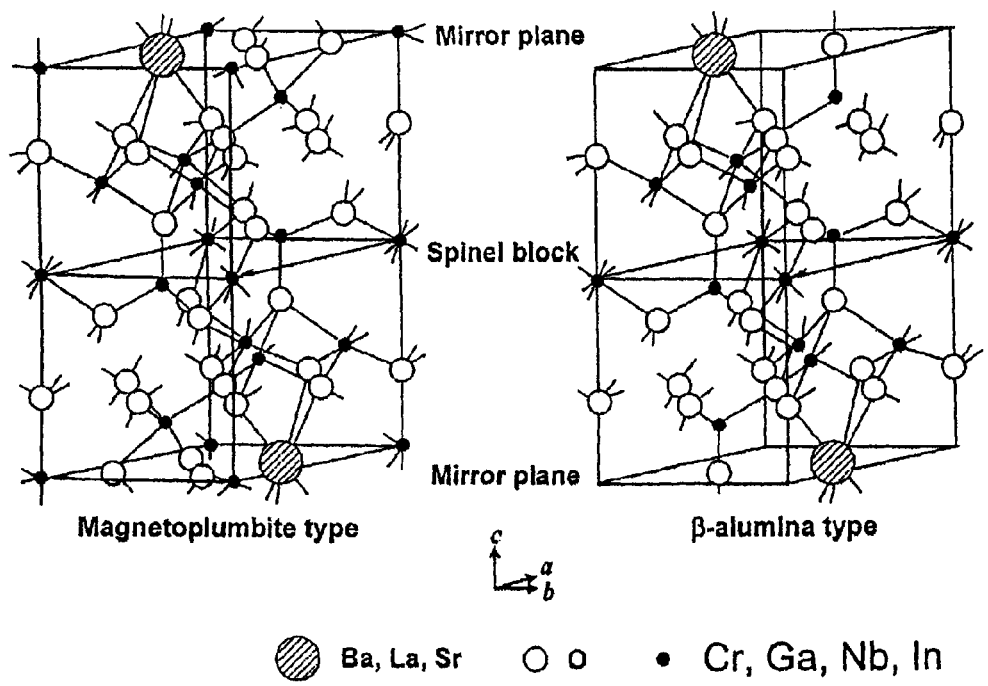
Figure 1. Structure of ideal magnetoplumbite and β–alumina

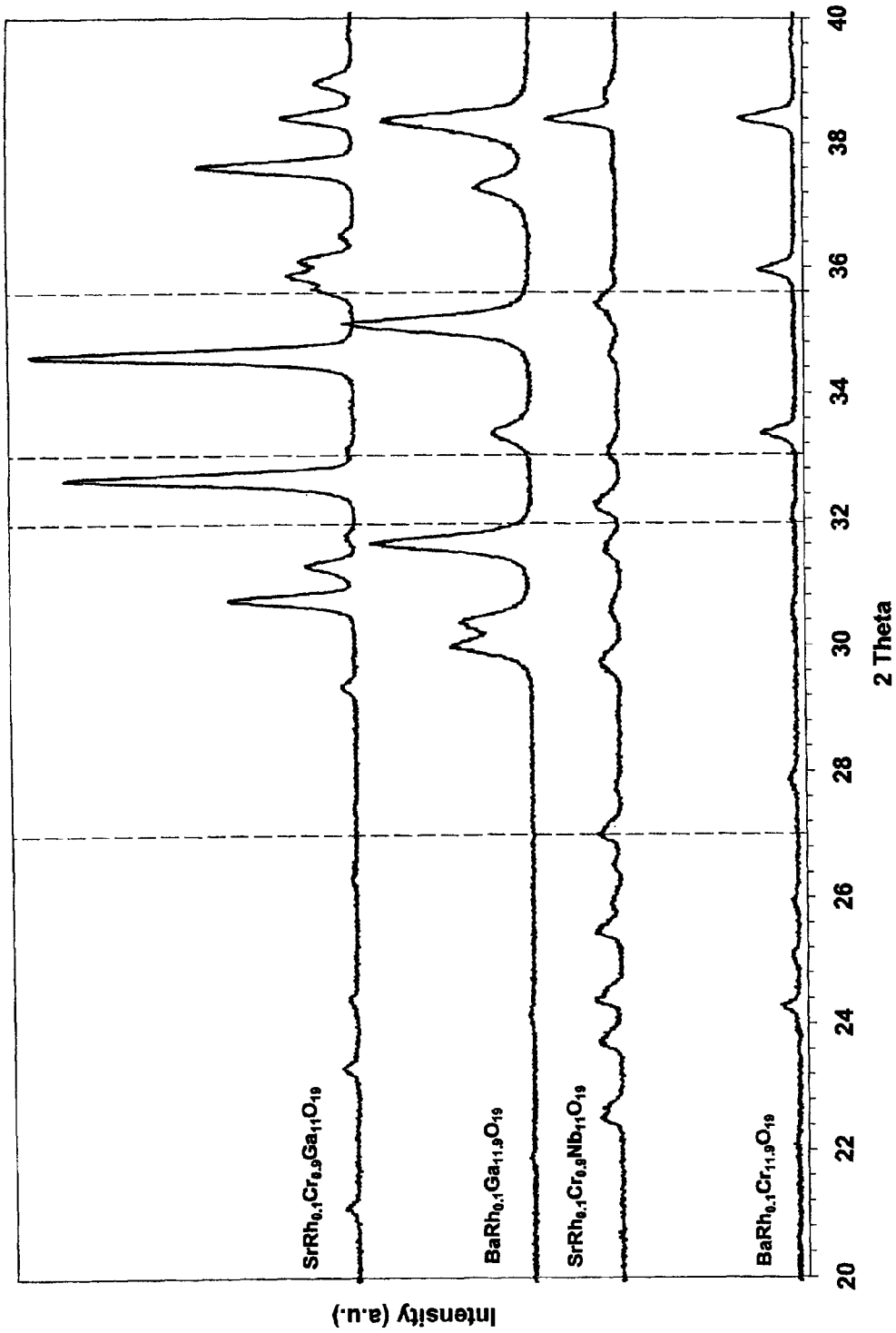
Figure 2. Powder XRD scan of hexametallate compounds. Shifts in the $\beta$-alumina observed in hexametallates were present due to a change in interatomic distances relative to hexaalumina.

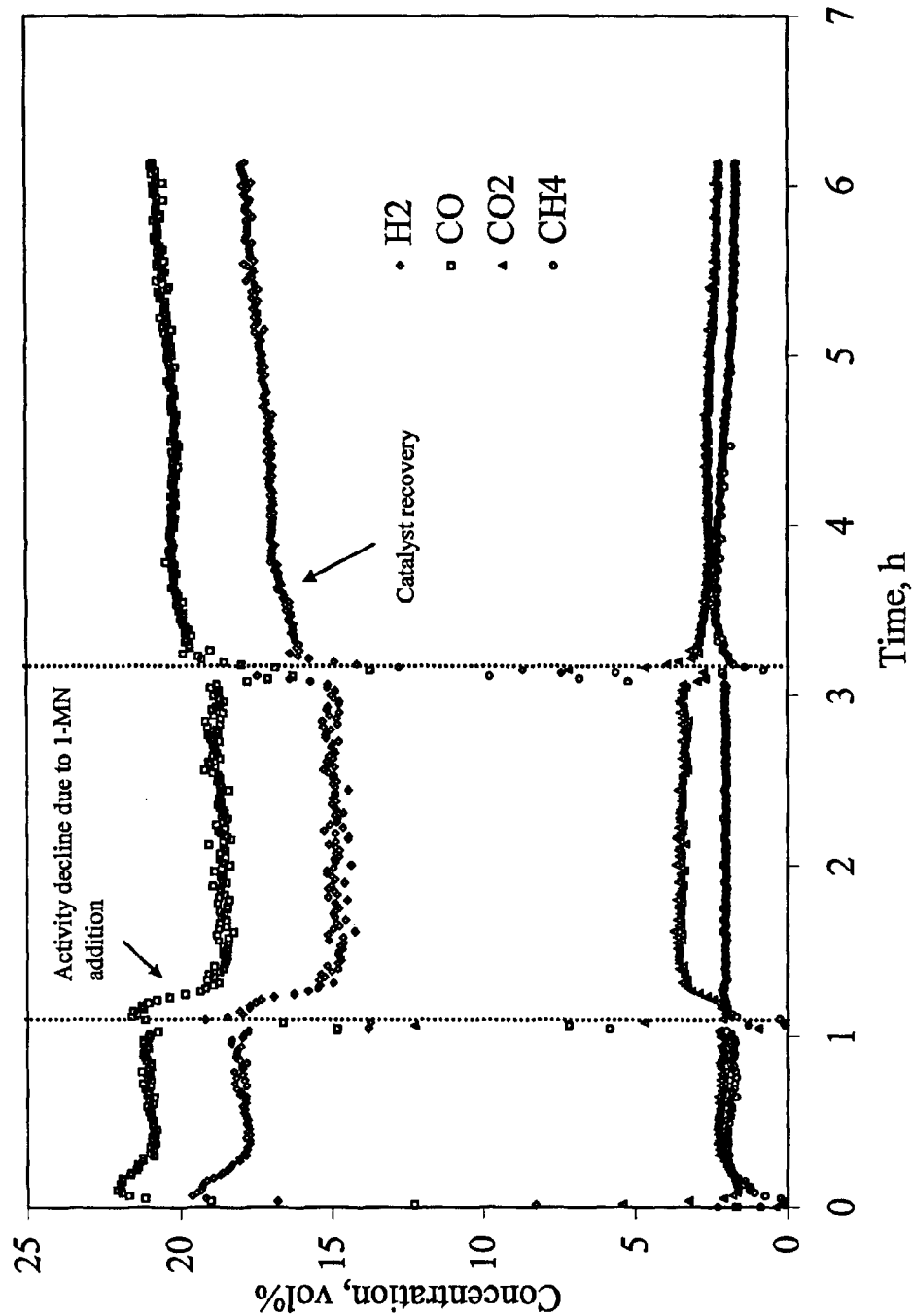
Figure 3. Step response from n-tetradecane to the introduction of 5 wt% 1-methylnaphthalene and recovery back to n-tetradecane over BaRh$_{0.1}$Cr$_{11.9}$O$_{19-\delta}$. The conditions were T = 900°C, P = 2 atm, O/C = 1.2, GHSV = 50,000 cm$^3$g$^{-1}$h$^{-1}$.

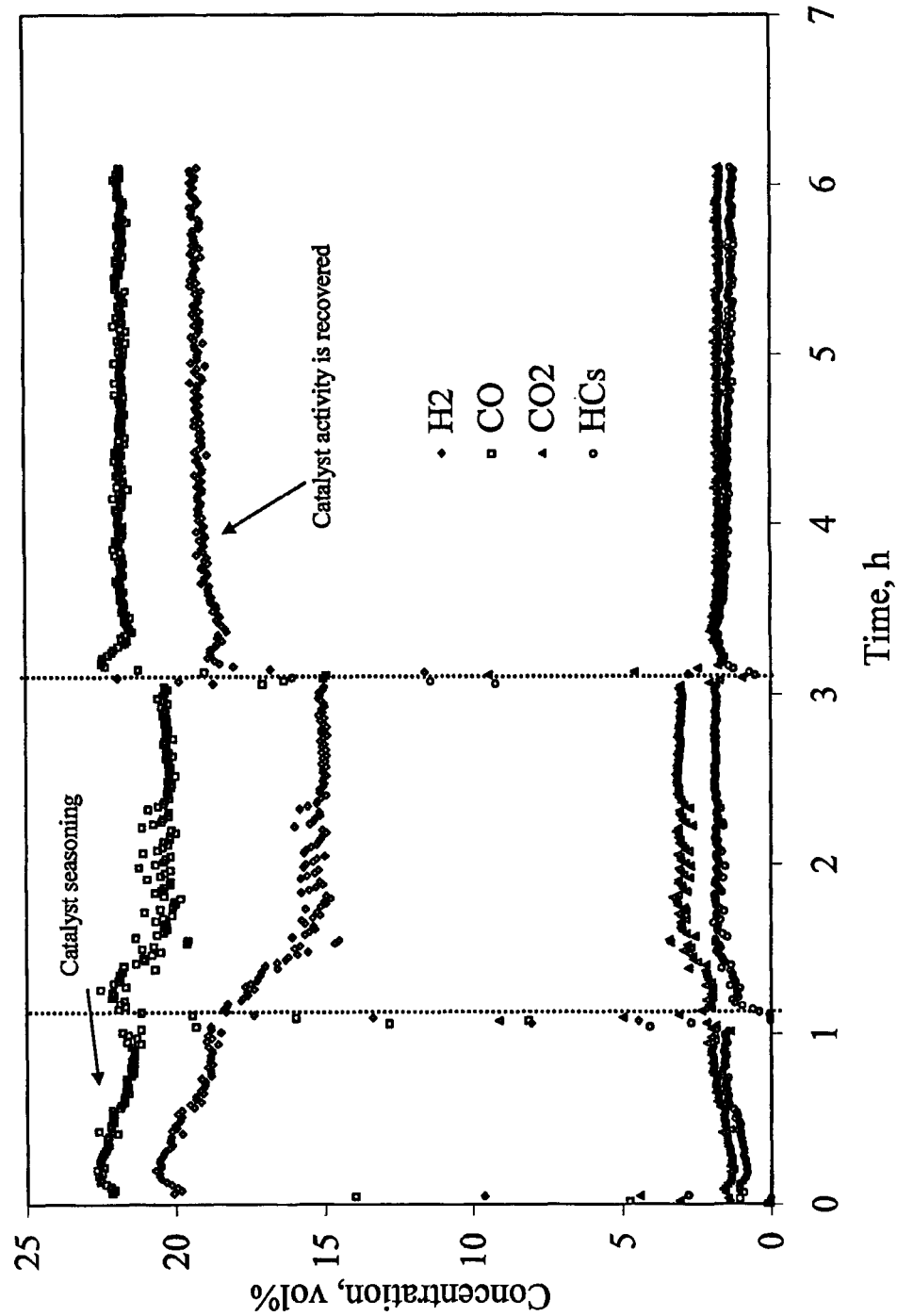
Figure 4. Step response from n-tetradecane to the introduction of diesel fuel (DF-2) and recovery back to n-tetradecane over $BaRh_{0.1}Cr_{11.9}O_{19-\delta}$. The conditions were T = 900°C, P = 2 atm, O/C = 1.2, GHSV = 50,000 $cm^3g^{-1}h^{-1}$.

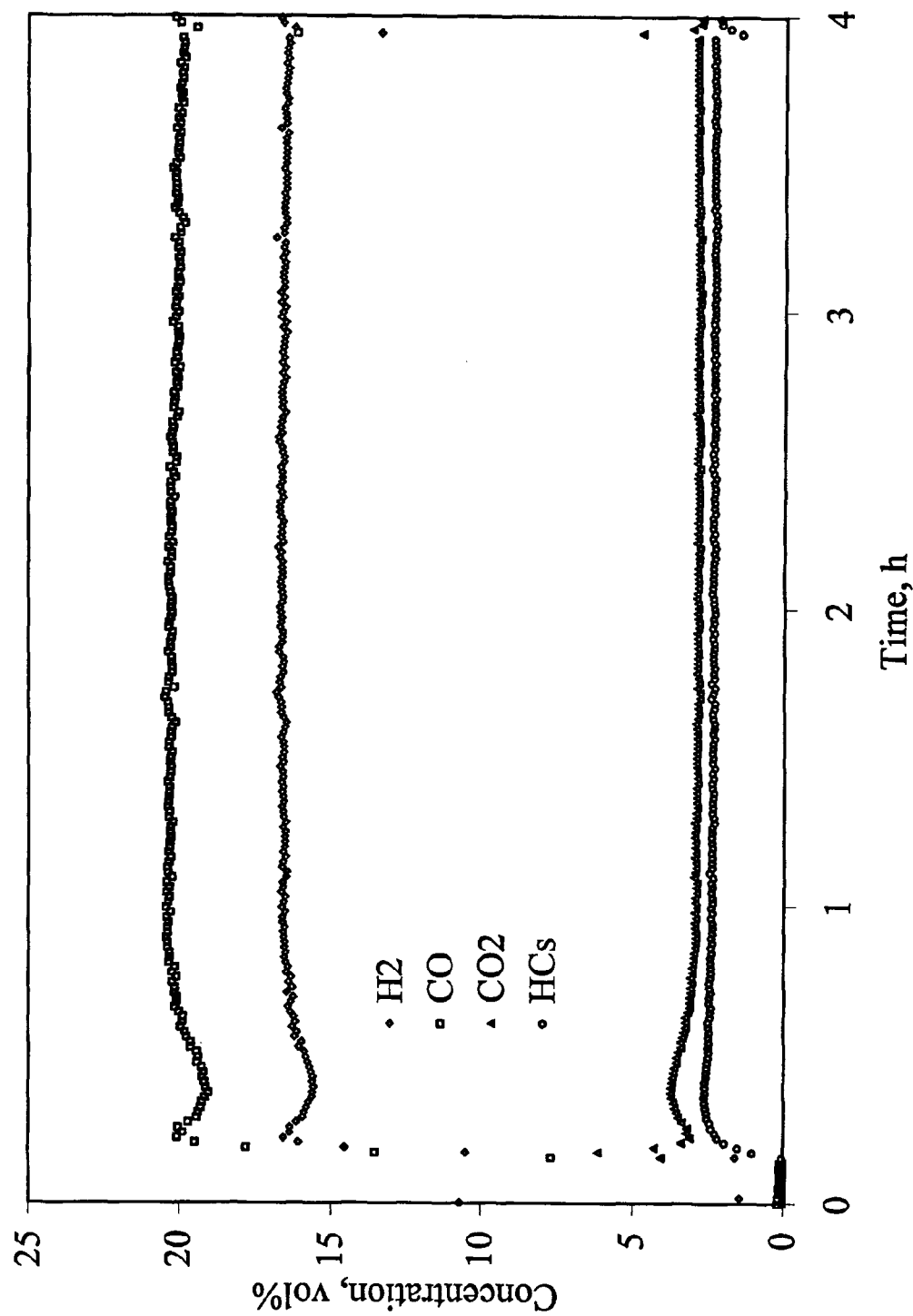
Figure 5. Isothermal run on n-tetradecane over BaPt$_{0.1}$Cr$_{11.9}$O$_{19-\delta}$. The conditions were T = 900°C, P = 2 atm, O/C = 1.2, GHSV = 50,000 cm$^3$g$^{-1}$h$^{-1}$.

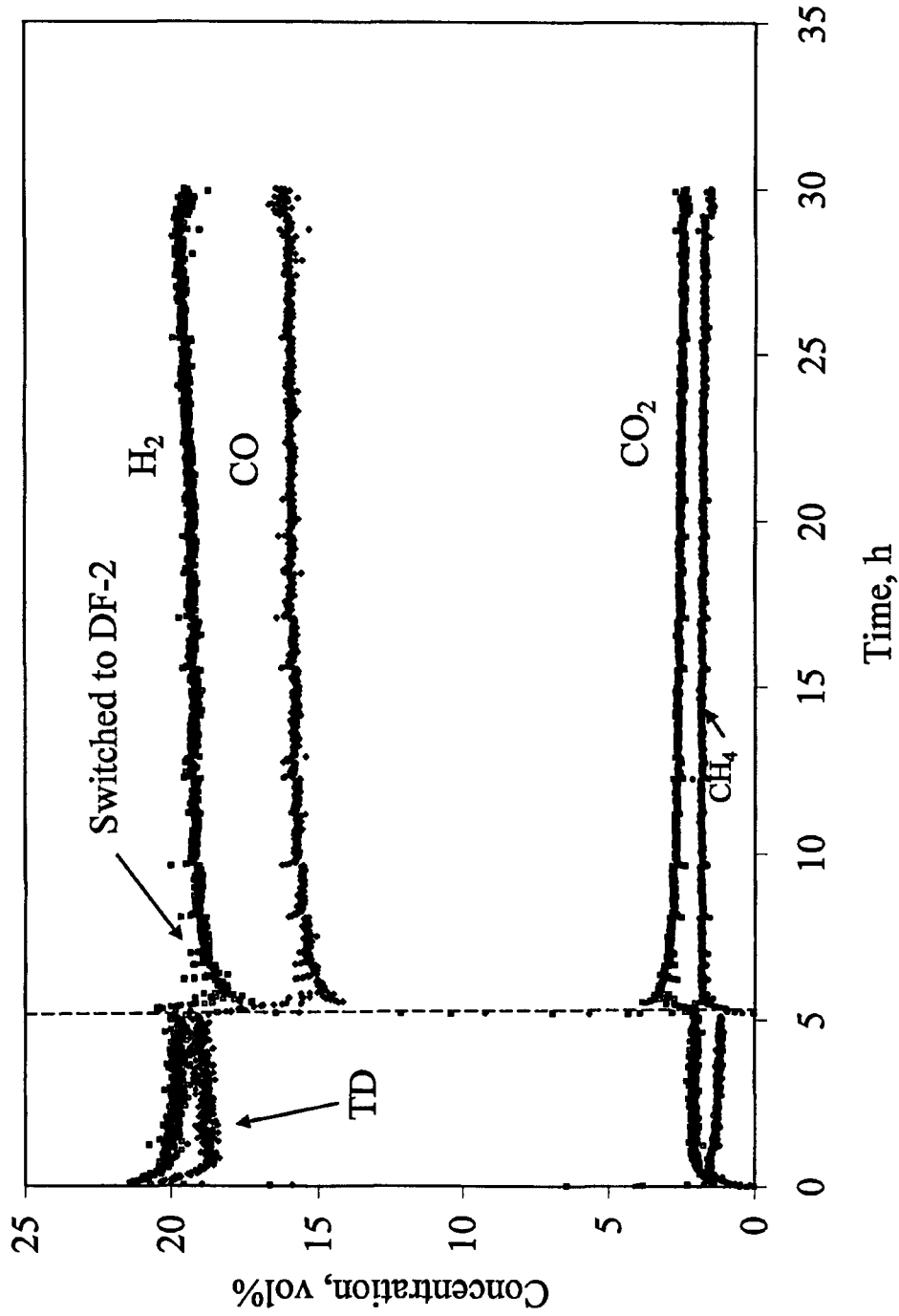
Figure 6. Step response from n-tetradecane to the introduction of DF-2 (C-T) over $BaRh_{0.1}Cr_{11.9}O_{19-\delta}$. The conditions were T = 900°C, P = 2 atm, O/C = 1.2, GHSV = 25,000 $cm^3 g^{-1} h^{-1}$.

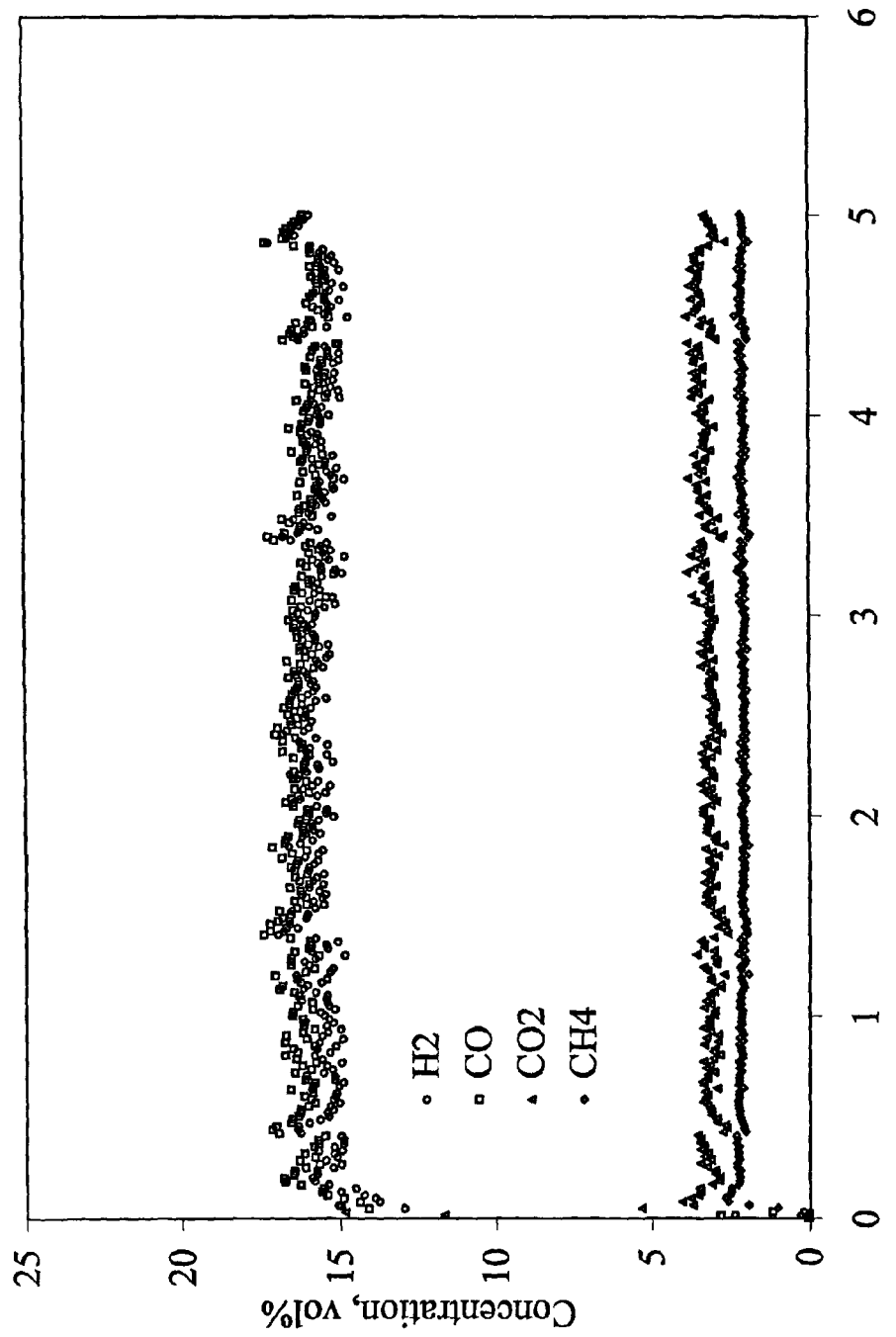
Figure 7. Isothermal run on n-tetradecane over $SrRu_{0.1}Cr_{11.9}O_{19-\delta}$. The conditions were T = 900°C, P = 2 atm, O/C = 1.2, GHSV = 50,000 $cm^3g^{-1}h^{-1}$.

nanostructured noble metal catalysts based on hexametallate architecture for the reforming of hydrocarbon fuels

CONTRACTUAL ORIGIN OF THE INVENTION

The United States Government has rights in this invention pursuant to the employer-employee relationship of the Government to the inventors as U.S. Department of Energy employees at the National Energy Technology Laboratory.

BACKGROUND OF THE INVENTION

1. Field of the Invention

This invention relates to metal catalysts for the reforming of hydrocarbon fuels, and more specifically, this invention relates to nano-structured noble metal catalysts based on hexametallate architecture for the reforming of hydrocarbon fuels.

2. Background of the Invention

Hydrogen reforming involves gasifying a carbon-containing fuel to produce a gas mixture containing varying amounts of carbon monoxide and hydrogen. More specifically, hydrocarbon reforming is a process used to develop synthesis gas, which in turn is used to synthesize hydrogen, methanol and ammonia.

Reforming is manifested in a myriad of ways. Examples include steam reforming of natural gas or liquid hydrocarbons to produce hydrogen. When starting out with higher carbon feedstocks, those higher hydrocarbons are first cracked to olefins and methane which in turn react further with steam to yield hydrogen and oxides of carbon.

The reforming process is usually carried out over catalysts which comprise one or more metal moieties, most commonly nickel and/or platinum. These metals may be combined with rhenium, tin, or iridium dispersed on an acidic support. Catalysts are combined with various support materials, including but not limited to aluminia, calcium aluminate, magnesia alumina, and combinations thereof. Alumina is a preferred support due to its versatility.

Catalytic activity is closely related to both the amounts and strength of acidic active sites distributed over the catalyst surface. Very weak acidic active sites may not be very catalytically active, and strongly acidic active sites can lead to excessive hydrocarbon cracking and carbon deposition on the surface.

Excessive carbon deposition can also occur due to aggregation of catalytic metal atoms to form larger crystals (Ostwald ripening). Sintering and sublimation of catalytic metal atoms under hydrocarbon cracking conditions can also be a problem. Ostwald ripening can be alleviated by relative isolation of individual catalytic metal atoms. Sintering and sublimation can be solved by strong attractions holding the catalytic metal atoms to the support material's crystal lattice.

A. The "Coking" Problem

Carbon deposition on the surface of a reforming catalyst is a continual and serious problem in the reforming of hydrocarbon fuels. Carbon deposition leads to a decrease in catalyst activity via the blocking of active sites. Forms of carbon known as whisker carbon can cause physical depletion of catalytic sites which in turn gives discontinuation of the catalytic process due to "reactor plugging" or poisoning of the catalytically active sites. Carbon deposition onto the surface of a conventional reforming catalyst occurs primarily through the dehydrogenation of strongly adsorbed hydrocarbons into polynuclear aromatic compounds known as "coke" and also through the pyrolytic decomposition of hydrocarbons.

The structure of the catalyst surface is defined by the dispersion of the catalytic metal and the coordination number of the active sites which contain the catalytic metal. Both of these factors, dispersion and coordination number, have been shown to affect the adsorption of hydrocarbons onto the surface of a catalyst. Reactions which lead to carbon deposits on catalysts are more likely on surfaces where the hydrocarbons have been strongly adsorbed. This strong adsorption occurs on electron rich surfaces such as those found in noble metals. The opposite effect, weak adsorption (i.e. surfaces more Lewis base-like which do not seek electrons) is found on electron deficient surfaces.

B. The Sulfur Problem

Sulfur compounds present in hydrocarbon feeds quickly deactivate or poison catalysts by preferentially adsorbing onto catalytically active sites which results in the sites' occlusion. At low ratios of hydrogen ($H_2$) to hydrogen sulfide ($H_2S$), hydrogen sulfide can also react with the active catalytic metals to form an inactive metal sulfide.

Sulfur compounds adsorb very strongly onto electron rich surfaces such as the surfaces of noble metals and weakly onto electron deficient surfaces.

The inventor has previously developed metal substituted hexaaluminate catalysts wherein the catalyst is directly doped with transition metals such as nickel, rhodium, and vanadium. That work is disclosed in U.S. patent application Ser. No. 11/390,216, filed on Mar. 28, 2006, by the instant assignee and incorporated herein by reference. By dispersing the metal crystallites such as nickel over the surface of an electron deficient support, carbon deposition is minimized and a strong metal-support interaction is created which prevents the metal crystallites from aggregating, sintering, and subliming.

U.S. Pat. No. 7,166,268 awarded to Fukunaga on Jan. 23, 2007 discloses a hydrocarbon reforming process and a hydrocarbon reforming catalyst. The catalyst comprises an alumina ($Al_2O_3$) carrier containing cerium oxide (CeO). The surface contains two required components "a" and "b", and third one "c" optional. Component "a" comprises at least one platinum group element selected from ruthenium Ru, platinum, rhodium, palladium, and iridium. Component "b" is cobalt Co and/or nickel Ni. Component "c" is an alkaline earth metal.

U.S. Pat. No. 7,150,866 awarded to Wieland, et al. on Dec. 19, 2006 discloses a process for the autothermal, catalytic steam reforming of hydrocarbons and a catalyst for said process. The catalyst has a multilayer structure and comprises a lower catalyst layer located directly on a support body and an upper catalyst layer located on the lower catalyst layer. Each catalyst layer comprises at least one platinum group metal on an oxidating support material.

U.S. Pat. No. 7,067,453 awarded to Ming, et al. on Jun. 27, 2006 discloses a catalyst consisting of an oxide or mixed oxide support and bimetallic catalytically active compounds selected from platinum, and ruthenium, and prepared in an appropriate ratio.

U.S. Pat. No. 6,958,310 awarded to Wang, et al. on Oct. 25, 2005 discloses two catalysts. The first catalyst comprises a first porous structure upon a second porous spinel structure and a steam reforming catalyst disposed upon the second porous surface.

U.S. Pat. No. 6,905,998 awarded to Naka et al. on Jun. 14, 2005 discloses a catalyst performance recovery method for a reforming catalyst apparatus. The method entails heating the catalyst to a temperature ranging from 500° C. to 800° C.

U.S. Pat. No. 6,884,340 awarded to Bodgan on Apr. 26, 2005 discloses a process for the catalytic reforming of a naphtha feedstock and two different catalysts. The first catalyst has a refractory inorganic oxide support with small portions of a platinum-group metal component, a tin (Sn) and/or germanium (Ge) component, an indium (In) component, and a lanthanide metal component. The second catalyst is similar to the first catalyst, but has only germanium as the second metal component and the lanthanide component is cerium or lanthanum (La).

U.S. Pat. No. 6,808,652 awarded to Park, et al. on Oct. 26, 2004 discloses a modified alumina ($Al_2O_3$)-supported nickel reforming catalyst which has improved coke resistance, and high-temperature catalytic stability and activity.

U.S. Pat. Nos. 6,294,492 and 6,291,381 awarded to Lin on Sep. 25 and Sep. 18, 2001, respectively, disclose an activation method for a catalytic reforming catalyst. A catalyst with carbon or coke depositions is treated by heating and contact with hydrogen gas ($H_2$) and organic chlorine-containing compounds. The contact reactivates the catalyst.

U.S. Pat. No. 6,171,992 awarded to Autenrieth et al. on Jan. 9, 2001 discloses a treatment process for a methanol reforming catalyst which pre-ages the catalyst so there will not be any noticeable decrease of the catalyst's efficiency due to a reduction of the catalyst's activity as a result of a decrease in the catalyst's volume. The method includes heating the catalyst to a temperature ranging from 240° C. to 350° C.

None of the aforementioned patents discloses a nano-structured noble metal catalyst wherein the noble metal atoms are isolated via their replacement of support crystal lattice metal atoms.

In addition, none of the aforementioned patents discloses a nano-structured catalyst wherein mirror cations of the lattice structure are chosen to reduce surface Lewis acidity. Therefore, none of the aforementioned patents claims aid in the oxidation of carbon deposits.

Also, none of the aforementioned patents discloses a nano-structured catalyst wherein the catalytic noble metal atoms are in electron deficient environments which aid in the prevention of both carbon depositions and the formation of inert metal sulfides.

Further, none of the aforementioned patents discloses a reforming catalyst which does not need pre-treatment before use or reactivation after use, i.e., a maintenance-free catalyst.

Also, none of the aforementioned patents disclose a method for hydrocarbon fuel reforming which employs a noble metal-doped hexametallate catalyst which is resistant to carbon deposition and the formation of inert metal sulfides.

Finally, none of the aforementioned patents disclose a method for preparing nano-structured hexametallate catalysts having a spinel block, and noble metal atoms dispersed throughout the interior of the lattice in electron deficient environments.

A need exists in the art for a nano-structured noble metal catalyst wherein the noble metal atoms are isolated via their replacement of support crystal lattice metal atoms.

A need also exists in the art for a nano-structured catalyst wherein mirror cations of the lattice structure are chosen to reduce surface Lewis acidity and aid in the oxidation of carbon deposits.

In addition, a need exists in the art for a nano-structured catalyst wherein the catalytic noble metal atoms are in electron deficient environments which aid in the prevention of carbon depositions and also of the formation of inert metal sulfides, in particular, catalyst with superior resistance to carbon deposits and metal sulfide formation.

Further, a need exists in the art for a reforming catalyst which does not need pre-treatment before use or reactivation after use, i.e., a maintenance-free catalyst.

In addition, a need exists in the art for a method for hydrocarbon fuel reforming which employs a noble metal-doped hexametallate catalyst which is resistant to carbon deposition and the formation of inert metal sulfides.

Finally, a need exists in the art for a method for preparing nano-structured hexametallate catalysts having a spinel block, and noble metal atoms dispersed throughout in electron deficient environments.

SUMMARY OF THE INVENTION

It is an object of the present invention to provide a method and catalysts for the reforming of hydrocarbon fuels that overcome many of the disadvantages of the prior art.

Another object of the present invention is to provide reforming catalysts which are more resistant to carbon deposition and sulfide formation than the reforming catalysts currently available. A feature of the invention is the use of electron deficient supports to provide electron deficient active sites of low coordination number. A second feature is that catalysts' lattices employ mirror ions which reduce the acidity of the lattice and aid in both preventing carbon deposition and the eventual desorption of moieties. One advantage of these features is weaker adsorption of hydrocarbons and electron acceptor sulfur compounds. Still another advantage of the results of these features is lower costs due to a much less likely need to regenerate or even replace the catalysts.

Still another object of the present invention is to provide a reforming catalyst with improved resistance to Ostwalt ripening. A feature of this invention is that the active metal atoms are dispersed as isolated sites throughout a crystal lattice. An advantage of this feature is that the atoms cannot aggregate to form metallic crystals. An additional advantage of this feature is an even greater resistance to the formation of coke and metal sulfides.

Yet another object of the present invention is to provide a reforming catalyst of hexametallate type which has adjustable catalytic activity. A feature of this invention is that changing the doping noble metal in the hexametallate structure yields different catalytic activity. An advantage of this feature is greater versatility of the catalysts.

Still another object of the present invention is to provide a catalyst which is resistant to active metal sintering and sublimation. A feature of this invention is replacing hexametallate metal ions such as chromium in the crystal lattice with noble metal atoms such as platinum to promote a strong interaction between the noble metal atoms and the lattice. An advantage of this feature is greater stability of the catalyst. An additional advantage is a greater life span of the catalyst and lower costs.

Yet another object of the invention is to provide a hydrocarbon fuel reforming method which uses catalysts resistant to carbon deposition and the formation of inert metal sulfides. A feature of the invention is the use of noble metal doped hexametallate catalysts and the positioning of catalytic noble metal atoms in electron deficient sites of the hexametallate crystal. An advantage of this feature is that the catalytic noble metal atoms are positioned in electron deficient sites. Yet another advantage of this feature is that the catalytic noble metal atoms are introduced into and maintained in the hexametallate lattice as isolated atoms.

Still another object of the invention is to provide a synthetic method for the preparation of the catalysts. A feature of the invention is the use of metal nitrates in aqueous solutions as the carriers of all metal ions in the catalysts. An advantage of this feature is ease of preparation due to solubility imparted to the nitrates and lower costs.

Briefly, the invention provides a method for producing a catalyst for reforming hydrocarbon fuels, the method comprising supplying a hexametallate material defining crystal structure positions, wherein said positions contain non-noble metal ions; and replacing a plurality of the non-noble metal ions with noble metal ions.

The invention also provides a catalyst for reforming hydrocarbon fuels, the catalyst comprising an oxygen ion-containing material defining crystal lattice positions for non-noble metal ions; and noble metal ions residing in a plurality of the lattice positions. Specifically, the invention provides a nano-structured noble metal catalyst based on hexametallate architecture for the reforming of hydrocarbon fuels to synthesis gas, comprising a hexametallate of the general formula $AB_xM_{12-x}O_{19-\delta}$ wherein A is selected from the alkali metals, alkaline earth metals, lanthanide metals, or a combination thereof; B is selected from one or more noble metals; and M from chromium (Cr), gallium (Ga), niobium (Nb), or combinations thereof.

Further, the invention provides a method of reforming a fuel containing hydrocarbons to produce a synthesis gas comprising contacting the hydrocarbon-containing fuel under reforming conditions with a catalyst of a hexametallate architecture, of a spinel type, of the general formula $AB_xM_{12-x}O_{19-\delta}$ wherein A is selected from the alkali metals, alkaline earth metals, lanthanide metals, or a combination thereof, B is selected from one or more noble metals (gold, platinum, rhodium, and ruthenium), or combinations thereof, M is selected from chromium (Cr), gallium (Ga), indium (In), niobium (Nb), or combinations thereof, whereby to convert at least a portion of the hydrocarbon-containing fuel to hydrogen and carbon monoxide.

In addition, the invention provides a method for preparing a nano-structured noble metal catalyst based on hexametallate architecture of a spinel type, and of the general formula $AB_xM_{12-x}O_{19-\delta}$, for the reforming of hydrocarbon fuels to synthesis gas, comprising forming an aqueous nitrate solution of the catalyst constituents in an acidic environment; adjusting the acidic environment to a pH sufficient to precipitate the constituents; filtering and rinsing the precipitate to remove extraneous liquid and ionic matter; and calcining the precipitate for a time period and temperature sufficient to produce the catalyst.

BRIEF DESCRIPTION OF THE DRAWING

The invention together with the above and other objects and advantages will be best understood from the following detailed description of the preferred embodiment of the invention shown in the accompanying drawings, wherein:

FIG. 1 is a schematic diagram of an idealized structure of β-alumina and of magnetoplumbite, in accordance with features of the present invention;

FIG. 2 is a plot of intensity versus 2θ (twice the actual diffraction angle) of the x-ray diffraction (XRD) patterns for hexametallate compounds;

FIG. 3 is a plot of concentration in volume percent (vol %) versus time (hrs) of a an initial reforming fuel before, during, and after reaction with a second fuel, using the invented catalyst, in accordance with features of the present invention;

FIG. 4 is a graph of concentration in volume percent versus time (hrs) of an initial reforming fuel with diesel fuel using an embodiment of the invented catalysts in accordance with features of the present invention;

FIG. 5 is a graph of concentration in volume percent versus time of outgasses from partial oxidation of an initial reforming fuel using a platinum-doped embodiment of the invented catalyst, in accordance with features of the present invention;

FIG. 6 is a graph plot of concentration in volume percent versus time of outgasses resulting from oxidation of an initial reforming fuel using an embodiment of the invented catalyst in the presence of diesel fuel, in accordance with features of the present invention, and FIG. 7 is a graph of concentration in volume percent versus time of outgasses resulting from oxidation of an intial reforming fuel using a strontium-doped embodiment of the invented catalyst, in accordance with features of the present invention.

DETAILED DESCRIPTION OF THE INVENTION

Carbon deposition can be minimized by the application of metals which possess 1) rapid C=C, C—C, and C—H bond dissociation rates, and 2) intrinsically low dehydrogenation activity. Low dehydrogenation activity means that carbon-carbon multiple bonds and aromatic structures are less likely to be created on the catalyst surface due to the abstraction of hydrogen (H) from carbon atoms. Elements such as alkaline earth elements, e.g., magnesium (Mg) and calcium (Ca) are often added to the catalysts' support lattices to reduce the lattices' Lewis acidity and therefore the hydrocarbon cracking associated with Lewis acidity. Alkali elements such as potassium (K) are often added to the surface as "promoters" to increase the adsorption of water ($H_2O$) and carbon dioxide ($CO_2$) to the surface of the catalyst. The presence of these two moieties on the surface aids in the gasification of carbon deposits via reactions to form carbon monoxide (CO) and carbon dioxide. Other elements such as cerium (Ce), a strong oxidizing agent, can be added to aid in this oxidation of deposited carbon on the catalysts' surfaces.

The invention provides a combination of noble metals on an electron deficient support surface lattice that yields catalysts not effected by "coking" or the formation of carbon deposits. In one embodiment of the invention, catalytically active noble metals replace support lattice metal atoms in a random, isolated manner to further enhance catalytic activity.

Nano-structured noble metal catalysts based on hexametallate architecture for the reforming of hydrocarbon fuels are presented herein. The term "nanostructure" has the same meaning as found in solid state physics, which is to say structures having a physical dimension smaller than 100 nanometers, ranging from clusters of atoms to dimensional layers. Embodiments of the instant invention utilize metal catalyst centers ranging in size from that of a single metal atom to 100 nanometers. The catalysts have active sites which are coordinatively unsaturated. These coordinatively unsaturated active sites provide a means for minimizing preferential adsorption and subsequent stabilizing of elemental carbon. As such, more ordered graphitic deposits (i.e., coking) on the catalysts are avoided. This feature reduces those active sites which are more selective towards carbon deposition and which show the strong adsorption of sulfur compounds.

Also provided is a method of reforming a fuel containing hydrocarbons to produce a synthesis gas comprising contacting the hydrocarbon-containing fuel under reforming conditions with the new nano-structured noble metal catalysts.

In addition, the inventor has devised a method for preparing the new nano-structured noble metal catalysts.

The catalysts can be effective at temperatures from about 700° C. to 1000° C.

The catalysts can be used at pressures from about 1 atmosphere (atm) to 30 atms.

The invented nano-structured noble metal catalysts comprising hexametallate architecture are catalytically active as catalysts in steam reforming (SR), autothermal reforming (ATR), and partial oxidation of hydrocarbon fuels to synthesis gas. These reforming reactions are expressed according to Equations 1 through 3, respectively.

$$C_nH_m + nH_2O \rightarrow nCO + (n+m/2)H_2 \quad \text{Eq. 1 (SR):}$$

$$1:C_nH_m + \lambda(O_2+3.76N_2) + (2n-2\lambda)H_2O \rightarrow nCO_2 + (2n-2\lambda+m/2)H_2 + (3.76n/2)N_2 \quad \text{Eq. 2 (ATR):}$$

$$C_nH_m + \tfrac{1}{2}n(O_2+3.76N_2) \rightarrow nCO + \tfrac{1}{2}mH_2 + (3.76/2)nN_2 \quad \text{Eq. 3 (PDX):}$$

where λ is the molar air-to-fuel ratio and m and n are positive, whole numbers.

The catalysts are of a hexametallate, spinel type (FIG. 1) having the general formula $AB_xM_{12-x}O_{19-\delta}$ wherein A is selected from the alkali metals, alkaline earth metals, lanthanide metals, and combinations thereof, B is selected from one or more noble metals, and combinations thereof, and M is selected from chromium, gallium, indium, niobium, and combinations thereof.

Active sites are formed in hexametallates when lattice bound oxygen adjacent to the noble metal is abstracted by hydrogen from the lattice.

The hexametallate is hexachromate $(AB_xCr_{12}O_{19})$, hexagalliate $(AB_xGa_{12}O_{19})$, hexaindiate $(AB_xIn_{12}O_{19})$, or hexaniobate $(AB_xNb_{12}O_{19})$, or any combination thereof.

A salient feature of the invention is the insertion of noble metals into the crystal lattice such that the noble metal atoms are physically isolated from each other. Given the reduced nature of the metal atoms, their oxidation state is zero on the catalyst surface. The coordinatively defective noble metal atoms/sites possess catalytic activity and selectivity comparable to that for true metal phase noble metals.

Suitable noble metals are catalytically reactive metals selected from the group consisting of gold, platinum, rhodium, ruthenium, and combinations thereof. The noble metal residing in the catalyst's active sites provide a means for altering the catalyst's activity.

The nano-structure created by the dispersing of individual noble metal atoms as isolated sites in the lattices of hexametallate crystals brings about a strong metal-support interaction via metallic bonding that prevents the noble metals from aggregating to form metal crystals, such aggregating known as "Ostwald ripening." This dispersion configuration also prevents sintering, and sublimation.

Aside from dispersing noble metals throughout a crystal lattice, dispersing these active catalytic metals over the surface of an electron deficient support imparts electron deficiency to the active metal surface. This provides a means to reduce adsorption of electron acceptor sulfur compounds to the surface.

Another salient feature of the invention is the insertion of particular metal cations as mirror ions to influence the coordination of noble metals in the mirror plane, which subsequently induces the formation of active metallic sites so as to cause coordinative unsaturation of the noble metals. The basicity or alkaline nature of the mirror ions reduce the Lewis acidity of the lattice and aid in preventing carbon deposition and also aid the eventual desorption of moieties.

The cations in the mirror planes of the catalyst are doped with alkali metal cations, alkaline earth metal cations, lanthanide metal cations, and combinations thereof. Thus, the doping cation in the catalyst's mirror plane includes, but is not limited to, barium, calcium, cerium, lanthanum, potassium, strontium, and combinations thereof. Generally, $\tfrac{1}{11}$ percent (i.e., about 9 percent) of the "M" moieties in the spinel type hexametallate formula is replaced with the "B" moieties.

The hexametallate structure consists of a spinel block of closely packed oxide ions that are charge-balanced by two large mono-, di-, or tri-valent cations. These cations reside within a mirror plane at opposite ends of the spinel block. Depending on the ionic radius and/or valence of the mirror plane cation, hexametallates possess either β-alumina or magnetoplumbite structure.

FIG. 1 is a schematic diagram of idealized structures of β-alumina and magnetoplumbite, both of which exhibit P6$_3$/mmc crystal symmetry. Positions are indicated for Ba, La, and Sr as mirror cations and for Cr, Ga, In, and Nb as hexametallate cations. The positions for the noble metal replacement ions Au, Pt, Rh, and Ru would be the same as those for Cr, Ga, In, and Nb. Oxygen within the mirror plane of hexametallates resides as a mono-atomic layer. In hexaalumina, this mono-atomic layer of oxygen is less tightly bound than oxygen present in the spinel block.

When the invented material is placed under reducing conditions, oxygen within the mirror plane of noble metal substituted hexametallates preferentially reduces, compared to oxygen in the normally-configured close-packed spinel block. This preferential reduction creates defect sites that expose the catalytically active noble metal sites.

With that, noble metal substituted hexametallates exhibit excellent resistance to carbon deposition due to electronic effects induced by active sites that are geometrically dispersed so as to give the noble metal atoms low coordination numbers. A low degree of coordination of the noble metal atoms (i.e., a low proximity of clusters or individual atoms to each other) lends itself to electron deficiency which aids against carbon deposition and metal sulfide formation.

Chromium (Cr), gallium (Ga), indium, (In), and Niobium (Nb) can easily be formed into the hexametallate structure, yielding the general formula $AB_yM_{12-y}O_{19}$. "A" represents the mirror cation while B represents the noble metal (Au, Pt, Rh, Ru) dopant. M represents the structural oxide (Cr, Ga, Nb, In) that comprise the framework lattice. The use of Cr, Ga, In, and Nb is ideal since their ionic radii are sufficient to accommodate noble metals into the lattice via substitution of a M ion by a B ion. This fact is demonstrated in Table 1 infra.

Table 1 demonstrates the similarity in size of framework metal atoms and dopant noble metal atoms. This size similarity is what enables the "doping" or replacement of the hexametallate lattice metal atoms with one or more noble metal atoms. For example, platinum has an atomic radius of 6.0 nm and thus can replace chromium metal atoms, atomic radius of 7.3 nm, in a hexachromate lattice. The physical effects of this "replacement method" were analyzed via x-ray diffraction (XRD) analyses which are given in FIG. 5. FIG. 5 depicts hydrocarbon reformation rates as induced by platinum-doped hexametallate lattice surfaces.

TABLE 1

| Ionic radii of hexametallate building blocks | |
|---|---|
| Element | Ionic radius (nm (Å)) |
| Lattice Framework Oxides (M) | |
| Cr | 7.3 (0.73) |
| Ga | 6.2 (0.62) |
| Nb | 7.2 (0.72) |
| In | 8.0 (0.80) |

TABLE 1-continued

Ionic radii of hexametallate building blocks

| Element | Ionic radius (nm (Å)) |
|---|---|
| Dopant Metals (B) | |
| Au | 8.5 (0.85)[1] |
| Pt | 6.0 (0.60) |
| Rh | 6.7 (0.67) |
| Ru | 6.8 (0.68) |

1. The ionic radius for the 3+ ion. (The 1+ ion has an ionic radius of 13.7 nm or 1.37 Å.)

FIG. 2 displays the XRD patterns for $SrRh_{0.1}Cr_{0.9}Ga_{11}O_{19}$, $BaRh_{0.1}Ga_{11.9}O_{19}$, $SrRh_{0.1}Cr_{0.9}Nb_{11}O_{19}$, $BaRh_{0.1}Cr_{11.9}O_{19}$ prepared as described infra and compares these XRD with that of β-alumina. The patterns display shifts in d-spacing and of the different angles of anticipated peaks due to changes in interpretive distances, i.e. band lengths. The vertical dashed lines indicate characteristic β-alumina peaks for $BaAl_{12}O_{19}$ as established by the Joint Committee on Powder Diffraction Standards (JCPDS). $LaAl_{12}O_{19}$, and $SrAl_{12}O_{19}$, peaks are very similar to those of $BaAl_{12}O_{19}$.

$SrRh_{0.1}Cr_{0.9}Ga_{11}O_{19}$ exhibits characteristic β-alumina peaks which have been shifted as indicated. When additional Cr is inserted into the lattice structure as was done with $SrRh_{0.1}Cr_{0.9}Ga_{11}O_{19}$ (Preparation Example 4 infra), the emergence of a triplet centered at a 2θ of 36° was observed. A peak centered at a 2θ of 33.5° was shifted to a lower value. The addition of Cr to a hexaniobate ($SrRh_{0.1}Cr_{0.9}Nb_{11}O_{19}$) (Preparation Example 5 infra) resulted in peaks which were comparable to those observed in $BaRh_{0.1}Ga_{11.9}O_{19}$. $BaRh_{0.1}Cr_{11.9}O_{19}$ (Preparation Example 1 infra) also exhibited characteristic β-alumina peaks which were shifted to slightly different angles.

Catalyst Preparation Detail

For all solutions initially prepared in Examples 1 through 7 infra, the volume of water used for each solution was approximately 300 milliliters (mL).

Example 1

Preparation of $BaRh_{0.1}Cr_{11.9}O_{19-\delta}$

The following preparation procedure is for making 1 Kilogram (Kg) of $BaRh_{0.1}O_{19-\delta}$ via co-precipitation from aqueous precursors. The following protocol of exact reagent values corresponds to the stoichiometric ratios of the one kilograms of catalyst. Therefore, the reagent values are illustrative in nature only. Thirty grams of rhodium nitrate ($Rh(NO_3)_2$) were dissolved in water at 60° C. In a separate container 4448 g of chromium nitrate ($Cr(NO_3)_3$) were dissolved in water. Similarly, 244 g of barium nitrate ($Ba(NO_3)_2$) were dissolved in water. The pH of these solutions can be adjusted downward, (e.g. to a pH of ~1 by the addition of nitric acid to enhance the nitrate salts' solubility in water. Once in solution, the salts are mixed together to form an aggregate solution mixture for a time and at a temperature sufficient such that the moieties are homogeneously dispersed throughout the mixture. The preferred solution temperature is 60° C. and the solution was stirred for 30 mins to ensure homogeneity of the solution.

Subsequent to the mixing of the nitrate salts' solutions, the aggregate solution was added slowly to an aqueous basic solution containing 2026 g of ammonium carbonate ($(NH_4)_2CO_3$) in water, at 60° C., and at a pH of 8.5. During the addition of the aggregate solution to the ammonium carbonate solution, the pH dropped from 8.5 to 7.0. This procedure precipitated out all of the Ba, Rh, and Cr as carbonates ($CO_3^{2-}$) and hydroxides ($OH^-$).

The resultant precipitate was subsequently aged for 6 to 8 hrs with constant stirring at 60° C. before filtration. The filtrate was then washed to remove extraneous nitrate and ammonia ($NH_3$). Subsequent to washing of the filtrate, the precipitate was dried at 110° C. and calcined directly in a furnace in air at 1300° C. for 4 hrs. In the alternative, the filtrate was extruded into pellets and subsequently calcined in a furnace in the presence of air at 1300° C. for 4 hrs.

Example 2

Preparation of $BaRh_{0.2}Cr_{11.9}O_{19-\delta}$

The following preparation procedure is for making 1 Kg of $BaRh_{0.2}Cr_{11.9}O_{19-\delta}$. by co-precipitation from aqueous precursors. Sixty grams of rhodium nitrate were dissolved in water at 60° C. In a separate container 4440 grams of chromium nitrate were dissolved in water. Similarly, 244 grams of barium nitrate were dissolved in water.

The adjustment of the pH of these solutions, mixing, and the temperature and stirring were carried out as given in Example 1 supra.

The aggregate nitrate salts' solution was treated as done in Example 1 with ammonium carbonate. This procedure precipitated out all of the Ba, Rh, and Cr as carbonates and hydroxides.

Aging of the precipitate, washing, drying, and calcining, including pellet formation was carried out as was done in Example 1.

Example 3

Preparation of $SrRu_{0.1}Cr_{11.9}O_{19-\delta}$

The following preparation procedure is for making 1 Kg of $SrRu_{0.1}Cr_{11.9}O_{19-\delta}$ using the citrate method. Twenty-four and a half (24.5) g of ruthenium chloride ($RuCl_3$) were dissolved in water at 60° C. In a separate container, 4666 g of chromium nitrate ($Cr(NO_3)_3$) were dissolved in water. Similarly, 207 g of strontium nitrate ($Sr(NO_3)_2$) were dissolved in water. The metal nitrates' solutions were mixed together and stirred to ensure homogeneity. Subsequent to the mixing of the metal nitrates' solutions, an equivalent amount of anhydrous citric acid (2240 g in the instant preparation) per total equivalent of metals in the aggregate metal nitrates' solution were added. The resultant solution was subsequently evaporated until a viscous liquid (gel) was obtained.

The resultant gel was subsequently evaporated to dryness at 110° C. and calcined directly in a furnace in air at 1300° C. for 4 hrs. In the alternative, the gel was extruded into pellets and then calcined at the aforementioned conditions.

FIG. 7 depicts the efficiency of the strontium-doped catalyst.

Example 4

Preparation of $SrRh_{0.1}Cr_{0.9}Ga_{11}O_{19-\delta}$

The following preparation procedure is for making 1 Kg of $SrRh_{0.1}Cr_{0.9}Ga_{11}O_{19-\delta}$ by co-precipitation from aqueous precursors. 26.6 g of rhodium nitrate were dissolved in water at 60° C. In a separate container, 296 g of chromium nitrate were dissolved in water and 3258 g of gallium nitrate ($Ga(NO_3)_3$). Similarly, 174 g of strontium nitrate were dissolved in water. The adjustment of the pH of these solutions, mixing, the temperature manipulations and the stirring were carried out as given in Example 1 supra.

The aggregate nitrate salts' solution was treated as done in Example 1 with ammonium carbonate, except that 1783 g of ammonium carbonate were utilized. This procedure precipitated out all of the Ga, Sr, Rh, and Cr as carbonates and hydroxides.

Aging of the precipitate, washing, drying, and calcining, including pellet formation was carried out as was done in Example 1.

Example 5

Preparation of $SrRh_{0.1}Cr_{0.9}Nb_{11}O_{19-\delta}$

The following preparation procedure is for making 1 Kg of $SrRh_{0.1}Cr_{0.9}Nb_{22}O_{19-\delta}$ by co-precipitation from aqueous precursors. 143.9 g of rhodium nitrate were dissolved in water at 60° C. In a separate container 244 g of chromium nitrate ($Cr(NO_3)_3$) were dissolved in water. 2020 g of niobium chloride ($NbCl_5$) were dissolved in water. Similarly, 143.9 g of strontium nitrate were dissolved in water.

The adjustment of the pH of these solutions, mixing, and the temperature and stirring were carried out as given in Example 1 supra.

The aggregate nitrate salts' solution was treated as done in Example 1 with ammonium carbonate, except that 2320 g of ammonium carbonate were used. This procedure precipitated out all of the Sr, Rh, Nb, and Cr as carbonates and hydroxides.

Aging of the precipitate, washing, drying, and calcining, including pellet formation was carried out as was done in Example 1.

Example 6

Preparation of $BaPt_{0.1}Cr_{11.9}O_{19-\delta}$

The following preparation procedure is for making 1 Kg of $BaPt_{0.1}Cr_{11.9}O_{19-\delta}$ by co-precipitation from aqueous precursors. Forty-eight g of chloroplatinic acid (dihydrogen hexachloroplatinate (IV) hexahydrate/$H_2PtCl_6.(H_2O)_6$) were dissolved in water at 60° C. In a separate container, 4414 g of chromium nitrate were dissolved in water. Similarly, 242 g of barium nitrate ($Ba(NO_3)_2$) were dissolved in water.

The adjustment of the pH of these solutions, mixing, and the temperature and stirring were carried out as given in Example 1 supra.

The aggregate nitrate salts' solution was treated as done in Example 1 with ammonium carbonate, except that 2024 g of ammonium carbonate were utilized. This procedure precipitated out all of the Ba, Pt, and Cr as carbonates and hydroxides.

Aging of the precipitate, washing, drying, and calcining, including pellet formation was carried out as was done in Example 1.

Example 7

Preparation of $BaRh_{0.1}In_{11.9}O_{19-\delta}$

The following preparation procedure is for making 1 Kg of $BaRh_{0.1}In_{11.9}O_{19-\delta}$ by co-precipitation from aqueous precursors. Eighteen grams of rhodium nitrate were dissolved in water at 60° C. In a separate container, 2114 g of indium nitrate ($In(NO_3)_3$) were dissolved in water. Similarly, 144 g of barium nitrate were dissolved in water.

The adjustment of the pH of these solutions, mixing, and the temperature and stirring were carried out as given in Example 1 supra.

The aggregate nitrate salts' solution was treated as done in Example 1 with ammonium carbonate, except that 3600 g of ammonium carbonate were used. This procedure precipitated out all of the Ba, Rh, and In as carbonates and hydroxides.

Aging of the precipitate, washing, drying, and calcining, including pellet formation was carried out as was done in Example 1.

Hydrocarbon fuels that can be reformed with the instant invention include, but are not limited to, middle distillate (diesel fuel), gasoline, natural gas, methane, ethanol, methanol, diethyl ether, military logistic fuels (JP-8, JP-5, NATO-F76, etc.), kerosene, naptha, bunker fuel, petroleum process residual fuels (petroleum residue).

Table 2 lists fuels used to test the catalysts' whose preparations are described supra. Discussions of FIGS. 3 through 7, which demonstrate the catalysts' activity with these fuels, are given infra after Table 2.

TABLE 2

| | Fuels tested | | | | | |
|---|---|---|---|---|---|---|
| Fuel | Manufacturer | Sulfur[1] | Aromatics[2] | Paraffins[2] | Naphthalenes[2] | MF (MW)[3] |
| DF-2 | CP[4] | 125 | 23 | 38 | 39 | $C_{15}H_{28}$ (207) |
| DF-2 | CT[5] | 9 | 18 | 38 | 44 | $C_{14}H_{27}$ (196) |
| Tetradecane | Alfa | 0 | 0 | 100 | 0 | n-$C_{14}H_{30}$ (198) |
| Methyl-naphthalene | Alfa | 0 | 100 | 0 | 0 | $C_{11}H_{10}$ (1-MN/142) |

[1]Parts per million weight/weight (ppm w/w).
[2]Weight percent (wt. %).
[3]Molecular formula and molecular weight in atomic mass units (amu).
[4]CP = ConocoPhillips, Houston, TX (DF-2 = Diesel Fuel-2: cetane rating between 40 to 55, rating close to that of home heating oil).
[5]CT = Chevron-Texaco, San Ramon, CA.

As indicated in Table 2 supra, DF-2 of ConocoPhllips has both a high sulfur and a high aromatic moiety content. And, of course, methylnaphthalene is an aromatic moiety. Amongst many, these two substances can block the catalytically active sites of reforming catalysts.

FIG. 3 displays the plot of a step response as concentration (volume percent) versus time in hours (h) with n-tetradecane (n-$C_{14}H_{30}$) as the initial reforming fuel. The catalyst is BaRh$_{0.1}$Cr$_{11.9}$O$_{19}$ and achieves stable operation after 15 minutes (mins). When n-C$_{14}$H$_{30}$/1-methylnaphthalene (5 wt percent 1-methylnaphthaleneMN) is introduced after slightly more than one hour of operation, the 1-methylnaphthalene adsorbs strongly relative to the n-C$_{14}$H$_{30}$ and is less reactive. A corresponding increase in gas phase chemistry is observed as indicated by the increase in CO$_2$ concentration. Notwithstanding, the reaction is stable. When the reforming fuel reaction condition is switched back to n-C$_{14}$H$_{30}$ after slightly more than three hours, the catalyst noticeably recovers as is seen by a decrease in CO$_2$ indicating that 1-MN was desorbed and thus had been reversibly adsorbed. The catalyst is self-cleaning. The conditions were T=900° C., P (total)=2 atm, oxygen to carbon ratio (O/C)=1.2, and Gas Hourly Space Velocity (GHSV)=50,000 cubic centimeters per gram per hour (cm$^3$ g$^{-1}$ h$^{-1}$).

FIG. 4 displays the plot of a step response as concentration (volume percent) versus time in hours (h) with the initial use of n-tetradecane (—C$_{14}$H$_{30}$) as a reforming fuel then changing to Diesel Fuel-2 (Chevron-Texaco) as a reforming fuel. The catalyst was BaRh$_{0.1}$Cr$_{11.9}$O$_{19}$ and went through an initial "seasoning" period, a break-in period at the beginning of an experiment when the catalyst is first contacted with the fuel to be reformed and air. Catalyst performance changes quickly in this time frame.

In this instance, the catalyst achieved stability after 45 mins. When the DF-2 was introduced after slightly more than one hour, the aromatic constituents in the DF-2 that are less reactive than n-tetradecane occupied a fraction of the active sites resulting in a decline in H$_2$ and CO production and a rise in the output of CO$_2$. Performance under this reaction condition was observed as being stable for 2 hours (hrs).

After slightly more than three hours, the feed was switched back to n-tetradecane and the catalyst recovered rapidly. The rapid recovery of the catalyst indicates that both the sulfur and aromatic compounds present in the diesel fuel had been reversibly adsorbed and had not adversely affected the catalyst. The conditions were the same as those given in FIG. 3.

FIG. 5 displays the plot of an isothermal partial oxidation as concentration (volume percent) versus time using n-C$_{14}$H$_{30}$ with the catalyst BaPt$_{0.1}$Cr$_{11.9}$O$_{19}$. The platinum catalyst quickly achieved stable operation and maintained a stable level of operation over a period of several hours for all four moieties, CH$_4$, CO, CO$_2$, and H$_2$. This is an indication that many different types of metals can be substituted into the lattice of hexametallate compounds and can still achieve a satisfactory level of catalytic activity. The conditions were the same as for FIGS. 3 and 4 supra.

FIG. 6 displays the results of a 30 hr test as a plot of concentration (volume percent) versus time where the first 5 hrs consisted of the partial oxidation of n-C$_{14}$H$_{30}$ with the catalyst BaRh$_{0.1}$Cr$_{11.9}$O$_{19}$. After 5 hrs, the feed was switched to Diesel fuel-2 and run with the same catalyst for another 25 hrs. The production of H$_2$ and CO dropped slightly, rose then stabilized. The rhodium catalyst exhibited excellent stability with respect to carbon deposition and metal sulfide formation in the presence of DF-2 during this time period. The concentration of carbon dioxide rose only slightly then declined. Stable operation was displayed for more than 30 hours of operation. The conditions were the same as for FIGS. 3, 4 and 5 except GHSV was 25,000 cm$^3$ g$^{-1}$ h$^{-1}$. "HC" designates hydrocarbons.

The catalysts are resistant to carbon deposition.

The catalysts are resistant to the formation of inert metal sulfides.

The catalysts' lattices employ mirror ions which reduce the acidity of the lattice and aid in both preventing carbon deposition and the eventual desorption of moieties.

The catalysts are easy to prepare using metal nitrates as the carriers of all metals used in the catalysts.

The catalysts do not require activation or regeneration.

The catalysts' surfaces self-renew by the desorption of any moieties adsorbed.

The strong interactions between the catalytic metal atoms and the hexametallate crystal lattice prevent sintering and sublimation.

The isolation of catalytic metal atoms within the hexametallate crystal lattice prevents aggregation or Ostwald ripening.

The catalysts provide a hydrocarbon fuel reforming method where the catalyst is resistant to carbon deposition and metal sulfide formation.

The catalysts can be used over a wide range of pressures and temperatures, up to 30 atm and 1000° C.

While the invention has been described with reference to details of the illustrated embodiments, these details are not intended to limit the scope of the invention as defined in the appended claims.

The embodiment of the invention in which an exclusive property or privilege is claimed is defined as follows:

1. A nano-structured noble metal catalyst having one or more catalytic sites, where the nano-structured noble metal catalyst is based on hexametallate architecture, comprising:
   a) a hexametallate nanostructure for the reforming of hydrocarbon fuels to synthesis gas consisting of a spinel lattice block of oxide ions charge balanced by two cations, the hexametallate having a general formula AB$_x$M$_{12-x}$O$_{19-\delta}$ wherein A is selected from the alkali metals, alkaline earth metals lanthanide metals or a combination thereof, B is a noble metal and M is chromium or gallium or indium or niobium (Nb), or a combination thereof; and
   b) wherein x is a range between 0.1 and 1.1 and δ is a number that renders the catalyst charged balanced.

2. The catalyst as recited in claim 1 wherein the noble metal is gold or platinum or rhodium or ruthenium or combinations thereof.

3. The catalyst as recited in claim 1 wherein the hexametallate is hexachromate (AB$_x$Cr$_{12-x}$O$_{19-\delta}$), hexagallate (AB$_x$Ga$_{12-x}$O$_{19-\delta}$), hexaindiate (AB$_x$In$_{12-x}$O$_{19-\delta}$), or hexaniobate (AB$_x$Nb$_{12-x}$O$_{19-\delta}$), and combinations thereof.

4. The catalyst as recited in claim 1 wherein the noble metal ions are isolated within the hexametallate lattice.

5. The catalyst as recited in claim 1 wherein the noble metal has replaced up to 1 of every 11 hexametallate metal atoms in the lattice.

6. The catalyst as recited in claim 1 wherein the hexametallate structure defines mirror planes facing in opposite directions, said mirror planes doped with ions selected from the group consisting of alkali metal cations, alkaline earth metal cations, lanthanide metal cations, and combinations thereof.

7. The catalyst of claim 1 wherein the catalytic sites are unsaturated.

8. The catalyst of claim 1 wherein the catalytic sites are formed when lattice bound oxygen adjacent to the noble metal is abstracted by hydrogen from the lattice.

9. The catalyst of claim 1 wherein metal cations are mirror ions which coordinate the noble metals in a region near the mirror plane.

10. The catalyst of claim 1 wherein the catalyst reforms hydrocarbon fuels to synthesis gas in a temperature range of approximately 700° C. to 1000° C.

* * * * *